United States Patent
Galbraith et al.

(10) Patent No.: US 10,008,229 B2
(45) Date of Patent: Jun. 26, 2018

(54) IMPLEMENTING ENHANCED TRACK FOLLOWING DURING READ BACK USING HEAD ASYMMETRY METRICS IN HARD DISK DRIVES

(71) Applicant: Western Digital Technologies, Inc., San Jose, CA (US)

(72) Inventors: Richard Leo Galbraith, Rochester, MN (US); Weldon Mark Hanson, Rochester, MN (US); Mark A. Nichols, San Jose, CA (US); Alexander Taratorin, Palo Alto, CA (US); Roger William Wood, Gilroy, CA (US)

(73) Assignee: WESTERN DIGITAL TECHNOLOGIES, INC, San Jose, CA (US)

( * ) Notice: Subject to any disclaimer, the term of this patent is extended or adjusted under 35 U.S.C. 154(b) by 276 days.

(21) Appl. No.: 14/988,651

(22) Filed: Jan. 5, 2016

(65) Prior Publication Data
US 2017/0194024 A1    Jul. 6, 2017

(51) Int. Cl.
*G11B 5/596*    (2006.01)

(52) U.S. Cl.
CPC ...... *G11B 5/59683* (2013.01); *G11B 5/59627* (2013.01)

(58) Field of Classification Search
CPC ......... G11B 5/012; G11B 5/02; G11B 5/3196; G11B 5/455–5/4555; G11B 5/596–5/59627; G11B 5/59683
USPC ............ 360/31, 53, 55, 69, 75, 77.01–77.08
See application file for complete search history.

(56) References Cited

U.S. PATENT DOCUMENTS

| | | | |
|---|---|---|---|
| 6,249,890 B1 | 6/2001 | Ukani et al. | |
| 6,529,340 B2 | 3/2003 | Gowda et al. | |
| 6,603,616 B2 * | 8/2003 | Takaoka ............ | G11B 5/59627 360/75 |
| 6,768,609 B2 * | 7/2004 | Heydt ................ | G11B 5/59627 360/77.02 |
| 7,102,839 B2 | 9/2006 | Berman et al. | |
| 7,161,752 B1 | 1/2007 | Cheng | |
| RE40,413 E * | 7/2008 | Despain ................ | G11B 5/596 360/77.06 |
| 7,489,469 B2 * | 2/2009 | Sun ..................... | G11B 5/59627 360/77.04 |
| 7,529,059 B2 * | 5/2009 | Ryu .................... | G11B 5/59688 360/77.02 |
| 7,688,540 B1 * | 3/2010 | Mei ...................... | G11B 5/5534 360/75 |

(Continued)

OTHER PUBLICATIONS

White, M. T. et al., "Improved track following in magnetic disk drives using a disturbance observer", IEEE/ASME Transactions, vol. 5, Issue 1, pp. 3-11, Mar. 2000 http://ieeexplore.ieee.org/xpl/login.jsp?tp=&arnumber=828584
&url=http%3A%2F%2Fieeexplore.ieee.org%2Fiel5%2F3516%2F17993%2F00828584.pdf%3Farnumber%3D828584.

*Primary Examiner* — Wayne Young
*Assistant Examiner* — James L Habermehl
(74) *Attorney, Agent, or Firm* — Patterson & Sheridan, LLP; Steven Versteeg (57) ABSTRACT

A method, apparatus, and system are provided for implementing track following using signal asymmetry metrics monitored during read back in hard disk drives (HDDs). Signal asymmetry metrics monitored during read back are used together with a position error signal (PES) to correct and guide the position of a read sensor with respect to a written track in the HDD.

17 Claims, 7 Drawing Sheets

(56) References Cited

U.S. PATENT DOCUMENTS

| | | | | |
|---|---|---|---|---|
| 7,885,025 B2* | 2/2011 | Eppler | ............... | G11B 5/59605 360/77.06 |
| 7,982,994 B1* | 7/2011 | Erden | ..................... | G11B 5/02 360/55 |
| 8,077,428 B1* | 12/2011 | Chen | .................. | G11B 5/59627 360/75 |
| 8,094,405 B1* | 1/2012 | Ying | .................. | G11B 5/59627 360/77.04 |
| 8,174,781 B2* | 5/2012 | Heeren | .................. | G11B 20/22 360/31 |
| 8,737,005 B1 | 5/2014 | Macken et al. | | |
| 8,773,806 B2* | 7/2014 | Springberg | ........ | G11B 5/59627 360/75 |
| 9,064,526 B1* | 6/2015 | Kawabe | ............ | G11B 5/59627 |
| 9,099,135 B1* | 8/2015 | Bao | .................... | G11B 5/59627 |
| 2012/0224277 A1 | 9/2012 | Steiner et al. | | |
| 2014/0036381 A1 | 2/2014 | Brockie et al. | | |

\* cited by examiner

IMPLEMENTING ENHANCED TRACK FOLLOWING DURING READ BACK USING HEAD ASYMMETRY METRICS IN HARD DISK DRIVES

FIELD OF THE INVENTION

The present invention relates generally to the data storage field, and more particularly, relates to a method, apparatus, and system for implementing enhanced track following using signal asymmetry metrics monitored during read back in hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Today's sector servo schemes are blind to any disturbances that occur between servo sectors and blind to the fact that the written data-tracks themselves may not accurately follow the position-error signals. Such inaccuracy can lead to read throughput loss.

A need exists for effective mechanism for implementing enhanced track following using signal asymmetry metrics monitored during read back in hard disk drives (HDDs). It is desirable to provide such a mechanism with simple to implement circuit technique amenable to present preamp and front-end technologies for detecting data signal asymmetry metrics and implementing enhanced track following.

SUMMARY OF THE INVENTION

Aspects of the preferred embodiments are to provide a method, apparatus, and system for implementing track following using signal asymmetry metrics monitored during read back in hard disk drives (HDDs). Other important aspects of the preferred embodiments are to provide such method, apparatus, and system substantially without negative effect and to overcome some of the disadvantages of prior art arrangements.

In brief, a method, apparatus, and system are provided for implementing track following using signal asymmetry metrics monitored during read back of written data tracks in hard disk drives (HDDs). Signal asymmetry metrics monitored during read back are used together with position error signals (PES) to correct and guide the position of a read sensor with respect to a written track in the HDD.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing enhanced track following using signal asymmetry metrics monitored during read back of a written data track in hard disk drives (HDDs).

Figure 1:
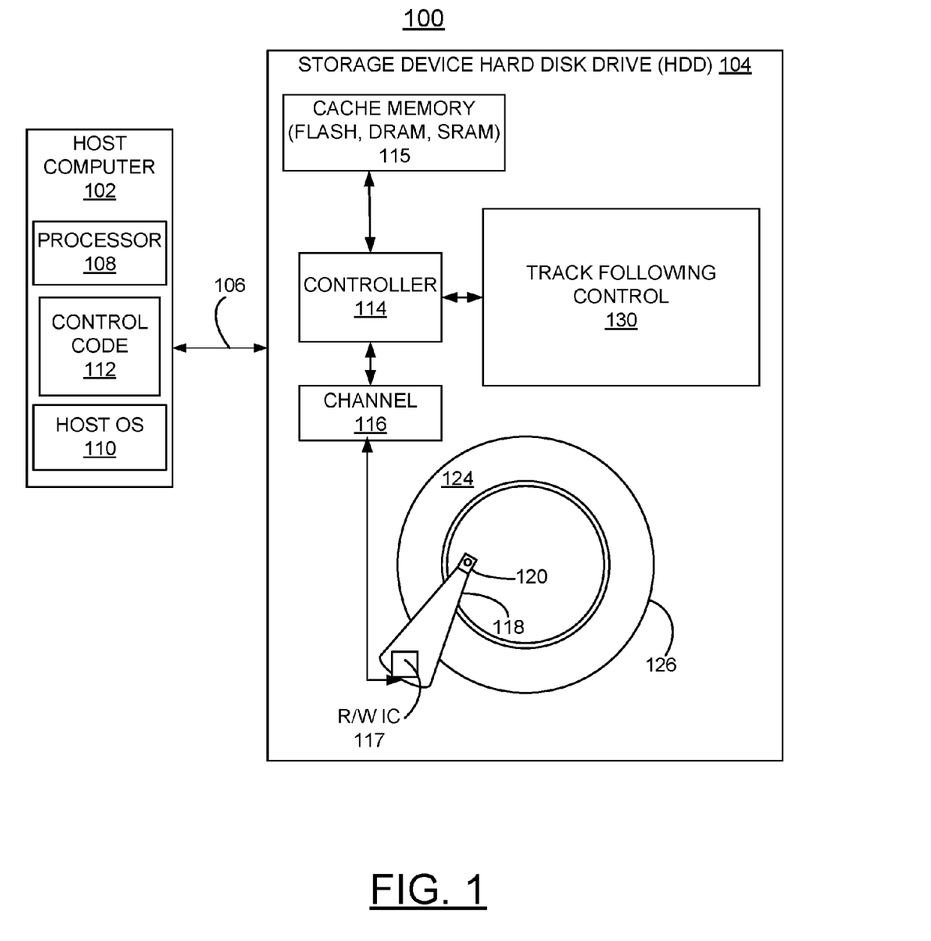
FIG. 1 is a block diagram representation illustrating a system for implementing enhanced track following using signal asymmetry metrics monitored during read back in hard disk drives (HDDs) in accordance with preferred embodiments.

Having reference now to the drawings, in FIG. 1, there is shown an example system generally designated by the reference character 100 for implementing enhanced track following using signal asymmetry metrics monitored during read back in hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or HDD 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing servo circuitry for track following using signal asymmetry metrics monitored during read back. The storage device or hard disk drive 104 includes an arm 118 carrying a slider 120 for in accordance with preferred embodiments. The slider 120 flies over a writable disk surface 124 of a disk 126 and includes a read sensor integrated with the slider 120.

In accordance with features of preferred embodiments, track following control 130 is provided with the controller 114 to control track following using signal asymmetry metrics monitored during read back of a written data track and also during data recovery procedures.

System 100 including the host computer 102 and the HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

In accordance with features of preferred embodiments, current TMR and GMR sensors employ a cross-track bias-field provided by a hard- or soft-magnet structure within the head. The field is essential in defining the sensitivity, linearity, and stability of the sensor. A sensor biased in this manner is relatively linear to fields from the medium that are perpendicular to the medium. However this is not true for fields that include a cross-track component. At the center of the track, the cross-track field component is small. As the sensor is moved away from the center, the cross-track field components from the medium become significant. The cross-track component adds to or subtracts from the cross-track bias field thus reducing or increasing the sensitivity of the sensor. The net result is a distinct nonlinear response to the magnetic signal. For example, in an off-track position, positive bits with corresponding positive cross-track component (with respect to the sensor bias field) will have reduced positive response whereas negative bits with a corresponding negative cross-track field will have an exaggerated negative response. In other words, there will be a pronounced negative asymmetry. On the other side of the track, the asymmetry will be positive. This behavior arises from the inherent asymmetry in the read sensor and is not related to the inherent asymmetry of an SMR track.

Figure 2:
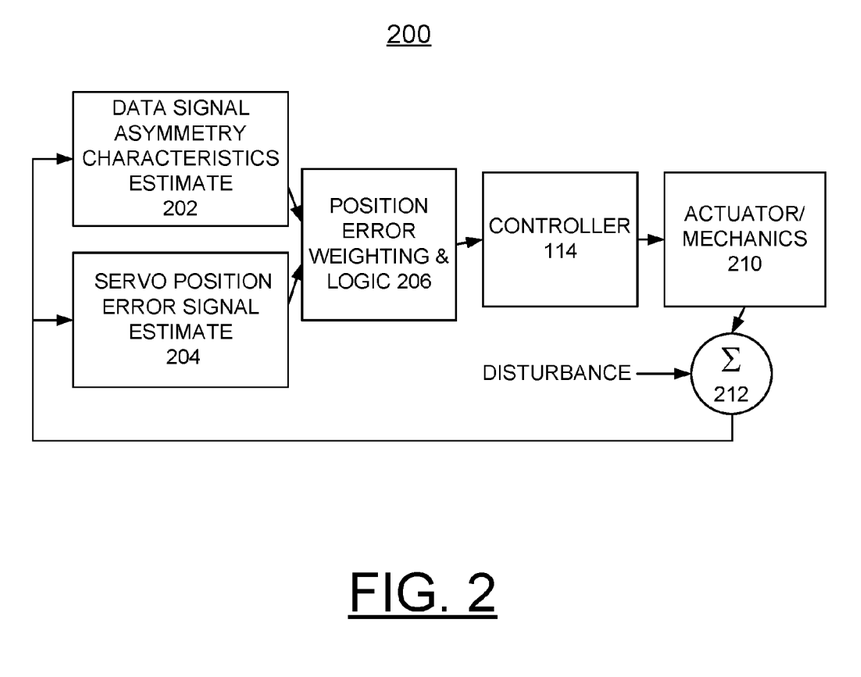
FIG. 2 schematically illustrates an example servo circuit for implementing enhanced track following using signal asymmetry metrics monitored during read back in hard disk drives (HDDs) in accordance with preferred embodiments.

Referring now FIG. 2, there is shown an example servo circuit generally designated by the reference character 200 for implementing enhanced track following using signal asymmetry metrics monitored during read back in hard disk drives (HDDs) in accordance with preferred embodiments. Servo circuit 200 includes an estimate from data signal asymmetry characteristics estimate 202 and an estimate from servo position error signal 204. A position error weighting and logic 206 receives a respective estimate from the data signal characteristics 202 and servo position error signal 204 and provides an input to controller 114. Servo circuit 200 includes an actuator/mechanics 210 receiving an output from controller 114, and a summation 212 receiving an output from the actuator/mechanics 210 and a disturbance input coupled from slider 120 and electronic noise. Summation 212 provides a respective signal input to the data signal asymmetry characteristics estimate 202 and to the servo position error signal estimate 204.

In accordance with features of preferred embodiments, at the data signal asymmetry characteristics estimate 202 the asymmetry of a waveform, y(t), advantageously is determined relatively quickly and robustly by, for example, accumulating the metric y|y| normalized by a second moment $E(y^2)$. Such metrics including data-directed estimates are already developed within current read/write channels 116 in order to set the asymmetric correction circuit in the front-end R/W IC 117 of the channel. For example, several thousand or tens of thousands of data bits can used to provide an estimate of asymmetry that is relatively free of sensitivities to specific data patterns on the home-track or adjacent tracks.

Figure 3:
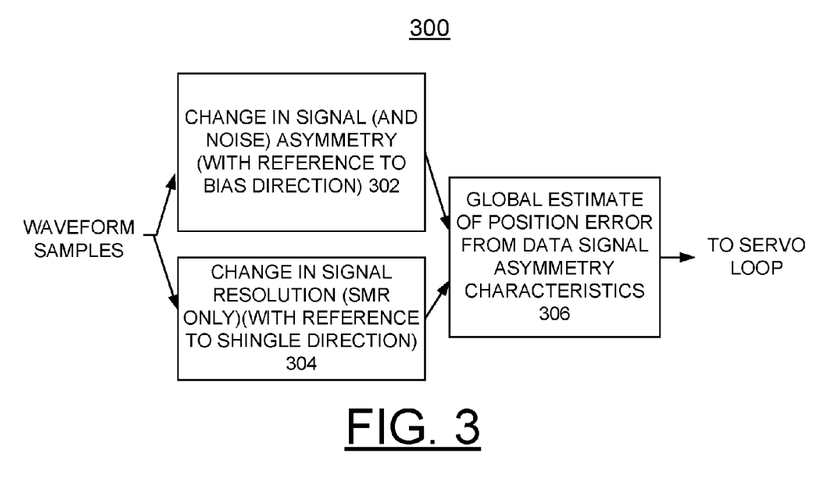
FIG. 3 schematically illustrates an example function of the circuit of FIG. 2 for implementing enhanced track following using signal asymmetry metrics monitored during read back in hard disk drives (HDDs) in accordance with preferred embodiments.

Referring now FIG. 3, there is shown an example circuit 300 for data signal asymmetry characteristics estimate 202 of the servo circuit 200 for implementing enhanced track following using signal asymmetry metrics monitored during read back in hard disk drives (HDDs) in accordance with preferred embodiments. Waveform samples are applied to a block 302 detecting change in signal asymmetry and optionally change noise asymmetry with reference to a signal bias direction from the written track and a block 304 detecting change in signal resolution, for example, for shingled magnetic recorded (SMR) data tracks only with reference to a shingle direction. The data signal asymmetry characteristics estimate circuit 300 includes a block 306 for generating a global estimate of position error from the data signal asymmetry characteristics, providing an output to the servo loop 200.

Figure 4:
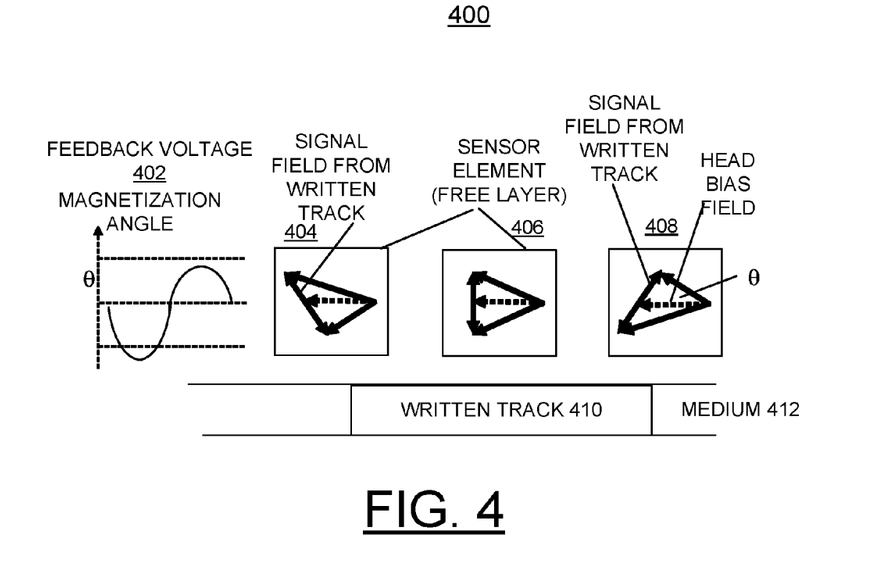
FIGS. 4, and 5, are charts illustrating example waveforms of the illustrated circuits of FIGS. 2 and 3 in accordance with preferred embodiments.

Referring now to FIG. 4, there are shown example waveforms generally designated by the reference character 400, for example, applied the illustrated circuits 200, 300 of FIGS. 2 and 3 in accordance with preferred embodiments. A feedback voltage 402 is shown with respect to a magnetization angle θ. Example waveforms 404, 406, and 408 are shown for a sensor element free layer, with respective signal field and head bias field from a written track 410 of a medium 412. Each read head has a different level of natural asymmetry and a different sensitivity to off-track fields. Carefully calibrating each head is provided for identifying changes in signal asymmetry to indicate changes in track-position. When the reader is not on track-center, the signal fields from the medium also involve a significant cross-track component. The cross-track component add or subtract from the bias field such that the net field and corresponding rotation of the sensor-magnetization become asymmetric in its positive-negative swings as shown by the example waveforms 404, 406, 408. The signal voltage from the sensor depends on angle and thus also becomes asymmetric in its response as the sensor moves off track. Estimating read asymmetry is performed, for example, as illustrated in FIG. 5.

Figure 5:
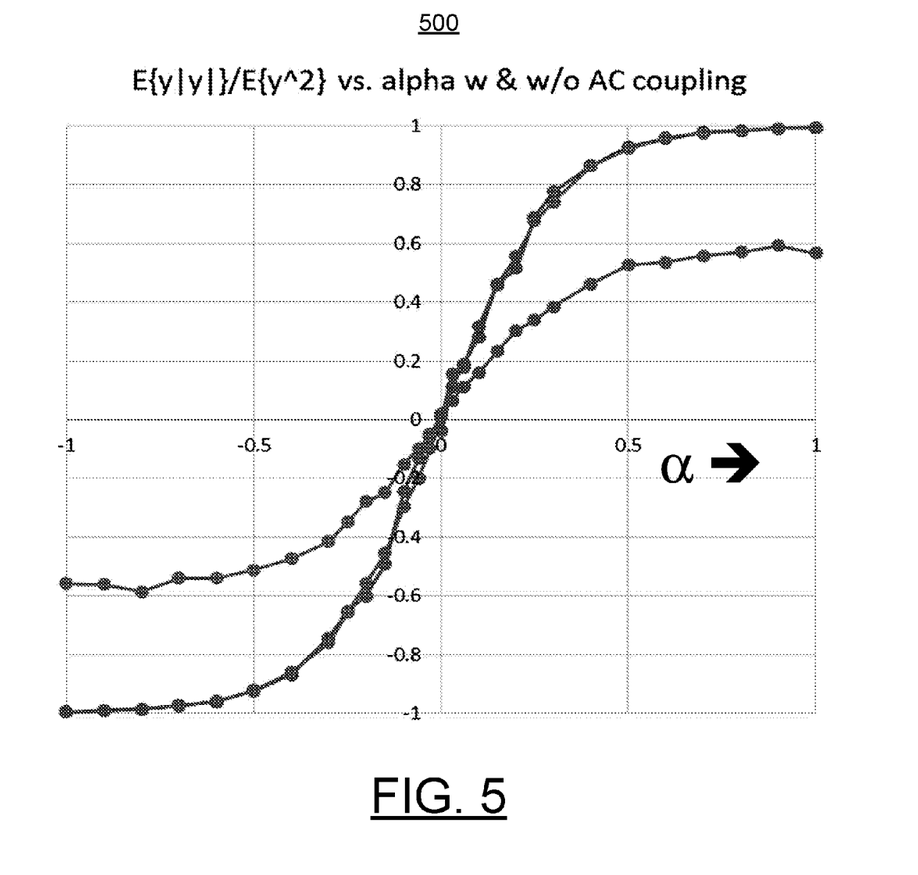

Referring now to FIG. 5, there are shown example waveforms generally designated by the reference character 500, for example, applied the illustrated circuits 200, 300 of FIGS. 2 and 3 in accordance with preferred embodiments. The asymmetry waveforms 500 as shown illustrate accumulating the metric E {y|y|} normalized by a second moment $E(y^2)$ or E {y|y|}/$E(y^2)$ versus alpha a with and without AC coupling. The asymmetry signal E {y|y|}/$E(y^2)$ can be provided on raw signal samples before any equalization, while more sophisticated decision-directed estimates can also be made. Signal asymmetry is a strong function of position with respect to the written track with maximum sensitivity being at data track center. Noise asymmetry, for example noise power by signal polarity, is a strong function of position with respect to the written track with maximum sensitivity being at data track center. In FIG. 5, waveforms 500 are evaluated, for example, on 4000 samples of unit independent and identically distributed (iid) Gaussian passed through $y=x+\alpha x^2$ with and without AC coupling.

Figure 6:
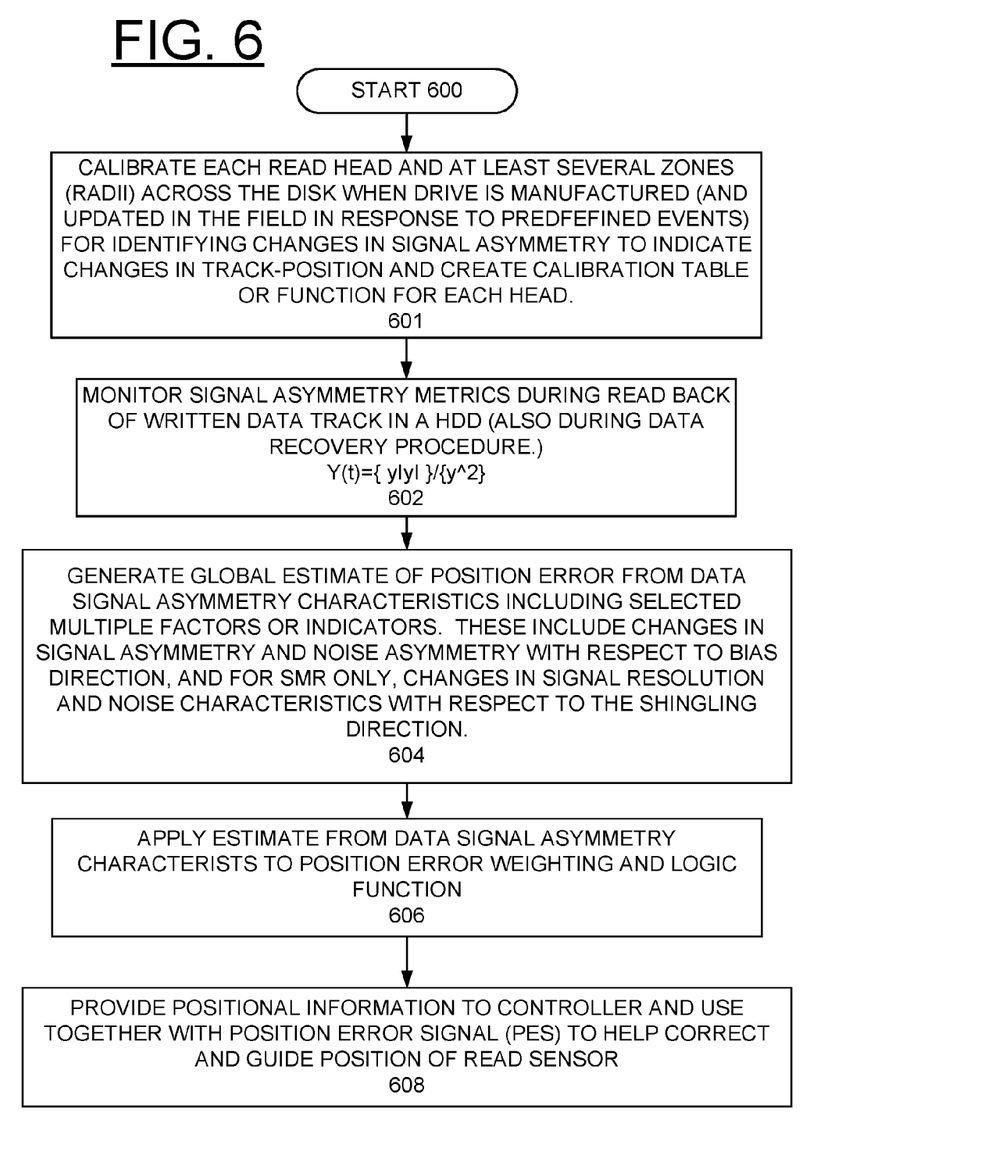
FIG. 6 is a flow chart illustrating example operations for implementing enhanced track following using signal asymmetry metrics monitored during read back in HDDs in accordance with preferred embodiments.

Referring now to FIG. 6, there is shown a flow chart illustrating example operations for implementing enhanced track following starting at block 600 in accordance with preferred embodiments. As indicated at a block 601, each read head is calibrated and at least several zones or radii across the disk when the drive is manufactured and then updated in the field in response to predefined events, such as a head-disk contact, for identifying changes in signal asymmetry to indicate changes in track-position and create a calibration table or function for each head. As indicated at a block 602, monitoring signal asymmetry metrics is performed during read back of a written data track in HDDs. For example, signal asymmetry metrics monitoring includes accumulating the metric E {y|y|} normalized by the second moment $E(y^2)$ or E {y|y|}/$E(y^2)$ of asymmetry y (t) waveform. As indicated at a block 604, global estimate of position error is generated from data signal asymmetry characteristics including multiple factors or indicator which preferably include at least changes in signal asymmetry and noise asymmetry with respect to a head bias direction, and for SMR only, changes in signal resolution and noise characteristics with respect to the shingling direction. As indicated at a block 606, the estimate from the data signal asymmetry characteristics is applied to error weighting and logic function. As indicated at a block 608, positional information is provided to the controller and used together with position error signal (PES) to help correct and guide position of the read sensor.

Figure 7:
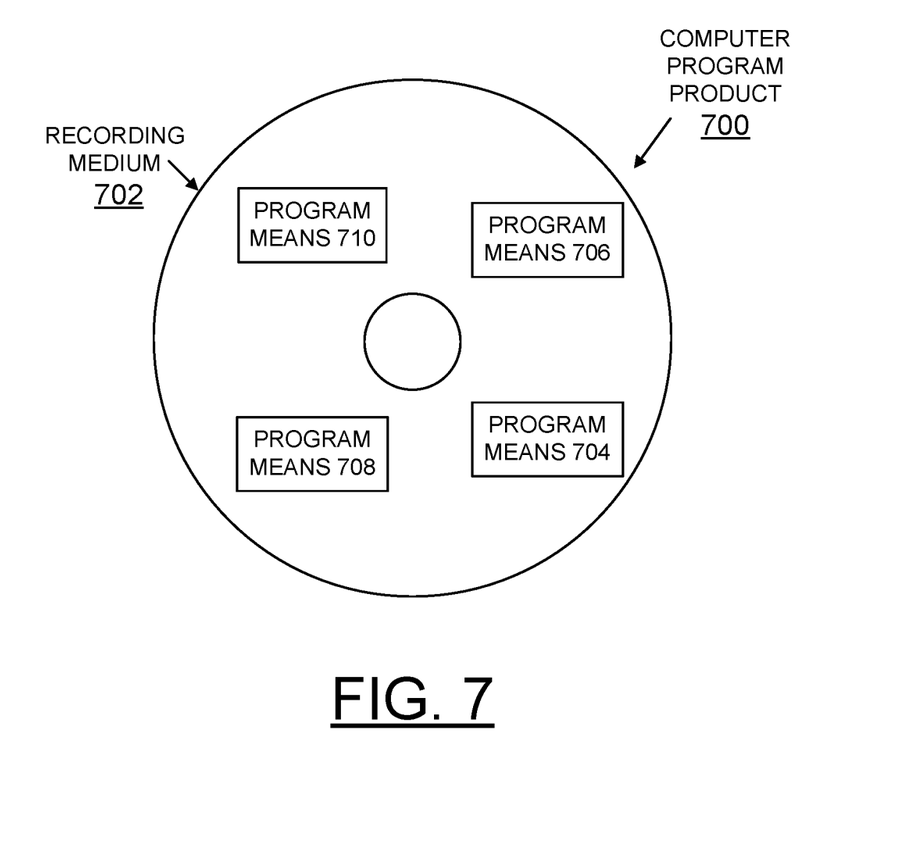
FIG. 7 is a block diagram illustrating a computer program product in accordance with preferred embodiments.

Referring now to FIG. 7, an article of manufacture or a computer program product 700 of the preferred embodiments is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing enhanced track following using signal asymmetry metrics monitored during read back of a written data track in HDDs in accordance with preferred embodiments in the system 100 of FIG. 1.

A sequence of program instructions or a logical assembly of one or more interrelated modules defined by the recorded program means or control code 704, 706, 708, 710, direct HDD controller 114 for generating an estimate of position error using signal asymmetry metrics monitored during read back in HDDs to implement enhanced track following of preferred embodiments.

While the present invention has been described with reference to the details of the embodiments of the invention shown in the drawing, these details are not intended to limit the scope of the invention as claimed in the appended claims.

What is claimed is:

1. A method for implementing track following in hard disk drives (HDDs), comprising:
    monitoring signal asymmetry metrics during read back and generating an estimate of position error from the monitored signal asymmetry metrics; and
    using the estimate of position error from the monitored signal asymmetry metrics together with a servo position error signal (PES) estimate to correct and guide position of a read sensor with respect to a written track in the HDD, wherein monitoring signal asymmetry metrics during read back and generating an estimate of position error from the monitored signal asymmetry metrics includes monitoring signal asymmetry metrics during read back of a written data track and during a data recovery procedure.

2. The method as recited in claim 1, wherein the monitoring signal asymmetry metrics during read back and generating an estimate of position error from the monitored signal asymmetry metrics includes monitoring signal asymmetry with respect to a head bias direction during read back of a written data track.

3. The method as recited in claim 1, wherein the monitoring signal asymmetry metrics during read back and generating an estimate of position error from the monitored signal asymmetry metrics further includes detecting change in signal resolution for shingled magnetic recorded (SMR) data tracks with reference to a shingle direction.

4. A method for implementing track following in hard disk drives (HDDs), comprising:
    monitoring signal asymmetry metrics during read back and generating an estimate of position error from the monitored signal asymmetry metrics; and
    using the estimate of position error from the monitored signal asymmetry metrics together with a servo position error signal (PES) estimate to correct and guide position of a read sensor with respect to a written track in the HDD, wherein monitoring signal asymmetry metrics during read back and generating an estimate of position error from the monitored signal asymmetry metrics includes monitoring signal asymmetry and noise asymmetry with respect to a head bias direction during read back of a written data track.

5. A method for implementing track following in hard disk drives (HDDs), comprising:
    monitoring signal asymmetry metrics during read back and generating an estimate of position error from the monitored signal asymmetry metrics; and
    using the estimate of position error from the monitored signal asymmetry metrics together with a servo position error signal (PES) estimate to correct and guide position of a read sensor with respect to a written track in the HDD, wherein monitoring signal asymmetry metrics during read back and generating an estimate of position error from the monitored signal asymmetry metrics further includes accumulating a metric E{y|y|} normalized by a second moment $E(y^2)$ or E{y|y|}/$E(y^2)$ of asymmetry y(t) waveform.

6. An apparatus for implementing track following in hard disk drives (HDDs), comprising:
    a controller; and
    at least one disk; said disk including a disk media including data tracks for storing data;
    wherein said controller is configured to perform at least:
        monitoring signal asymmetry metrics during read back and generating an estimate of position error from the monitored signal asymmetry metrics; and
        using the estimate of position error from the monitored signal asymmetry metrics together with a servo position error signal (PES) estimate to correct and guide position of a read sensor with respect to a written track in the HDD, wherein said monitoring signal asymmetry metrics during read back and generating an estimate of position error from the monitored signal asymmetry metrics includes monitoring noise asymmetry with respect to a head bias direction during read back of a written data track.

7. The apparatus as recited in claim 6, wherein the monitoring signal asymmetry metrics during read back and generating an estimate of position error from the monitored signal asymmetry metrics further includes using control code for generating an estimate of position error from the monitored signal asymmetry metrics to implement track following.

8. The apparatus as recited in claim 6, wherein the monitoring signal asymmetry metrics during read back and generating an estimate of position error from the monitored signal asymmetry metrics further includes monitoring signal asymmetry with respect to a head bias direction during read back of a written data track.

9. The apparatus as recited in claim 6, wherein the monitoring signal asymmetry metrics during read back and generating an estimate of position error from the monitored signal asymmetry metrics further includes detecting change in signal resolution for shingled magnetic recorded (SMR) data tracks with reference to a shingle direction.

10. A system comprising a hard disk drive (HDD) comprising the apparatus as recited in claim 6.

11. An apparatus for implementing track following in hard disk drives (HDDs), comprising:
a controller; and
at least one disk; said disk including a disk media including written data tracks for storing data;
wherein said controller is configured to perform at least:
monitoring signal asymmetry metrics during read back and generating an estimate of position error from the monitored signal asymmetry metrics; and
using the estimate of position error from the monitored signal asymmetry metrics together with a servo position error signal (PES) estimate to correct and guide position of a read sensor with respect to a written track in the HDD, wherein said monitoring signal asymmetry metrics during read back and generating an estimate of position error from the monitored signal asymmetry metrics includes accumulating a metric E{y|y|} normalized by a second moment E(y^2) or E{y|y|}/E(y^2) of asymmetry signal waveform y (t).

12. A system comprising a hard disk drive (HDD) comprising the apparatus as recited in claim 11.

13. An apparatus for implementing track following in hard disk drives (HDDs), comprising:
a controller; and
at least one disk; said disk including a disk media including written data tracks for storing data;
wherein said controller is configured to perform at least:
monitoring signal asymmetry metrics during read back and generating an estimate of position error from the monitored signal asymmetry metrics; and
using the estimate of position error from the monitored signal asymmetry metrics together with a servo position error signal (PES) estimate to correct and guide position of a read sensor with respect to a written track in the HDD, wherein said monitoring signal asymmetry metrics during read back and generating an estimate of position error from the monitored signal asymmetry metrics includes monitoring signal asymmetry metrics during read back of a written data track and during a data recovery procedure.

14. A system comprising a hard disk drive (HDD) comprising the apparatus as recited in claim 13.

15. An apparatus for implementing track following in hard disk drives (HDDs), comprising:
a controller; and
at least one disk; said disk including a disk media including written data tracks for storing data;
wherein said controller is configured to perform at least:
monitoring signal asymmetry metrics during read back and generating an estimate of position error from the monitored signal asymmetry metrics; and
using the estimate of position error from the monitored signal asymmetry metrics together with a servo position error signal (PES) estimate to correct and guide position of a read sensor with respect to a written track in the HDD, wherein said monitoring signal asymmetry metrics during read back and generating an estimate of position error from the monitored signal asymmetry metrics includes generating a global estimate of position error and applying said estimate to position error weighting and logic function.

16. A system for implementing track following in hard disk drives (HDDs), comprising:
a hard disk drive (HDD), said HDD comprising a controller and at least one disk, wherein said disk includes a disk media including written data tracks for storing data;
wherein said controller is configured to perform at least:
monitoring signal asymmetry metrics during read back and during data recovery and generating an estimate of position error from the monitored signal asymmetry metrics; and
using the identified estimate from the monitored signal asymmetry metrics together with a servo position error signal (PES) estimate to correct and guide position of a read sensor with respect to a written track in the HDD, wherein the monitoring signal asymmetry metrics during read back and during data recovery and generating an estimate of position error from the monitored signal asymmetry metrics includes determining signal asymmetry of a waveform y(t) by accumulating a metric E{y|y|} normalized by a second moment E(y^2) or E{y|y|}/E(y^2).

17. A system for implementing track following in hard disk drives (HDDs), comprising:
a hard disk drive (HDD), said HDD comprising a controller and at least one disk, wherein said disk includes a disk media including written data tracks for storing data;
wherein said controller is configured to perform at least:
monitoring signal asymmetry metrics during read back and during data recovery and generating an estimate of position error from the monitored signal asymmetry metrics; and
using the identified estimate from the monitored signal asymmetry metrics together with a servo position error signal (PES) estimate to correct and guide position of a read sensor with respect to a written track in the HDD, wherein the monitoring signal asymmetry metrics during read back and during data recovery and generating an estimate of position error from the monitored signal asymmetry metrics includes monitoring noise asymmetry with respect to a head bias direction during read back of a written data track.

* * * * *